Feb. 19, 1929.  W. S. ALLEN  1,702,990
PRESSURE DEVICE
Filed May 5, 1928  3 Sheets-Sheet 1
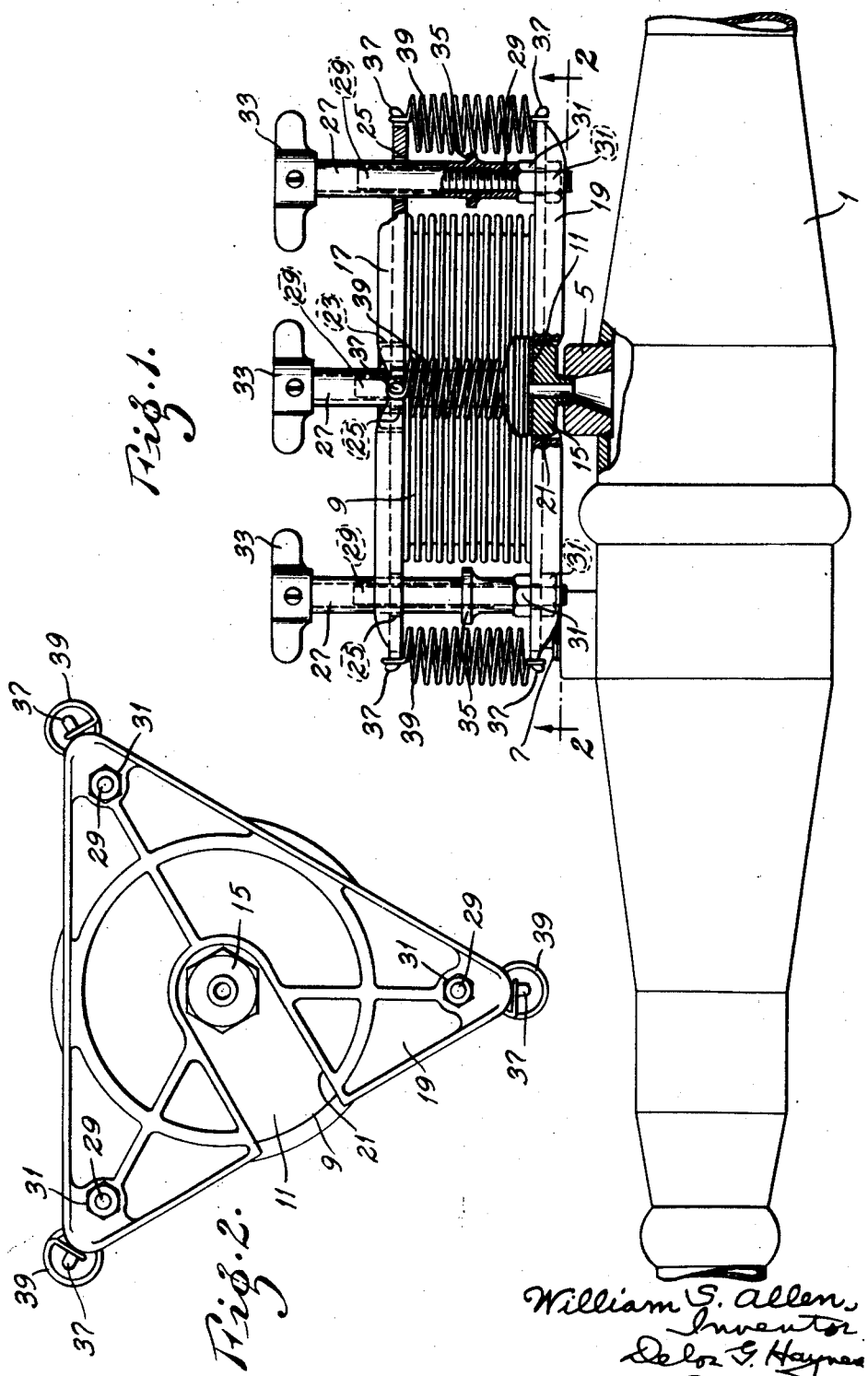
William S. Allen, Inventor
Delos G. Haynes, Attorney.

Feb. 19, 1929.  W. S. ALLEN  1,702,990
PRESSURE DEVICE
Filed May 5, 1928  3 Sheets-Sheet 2
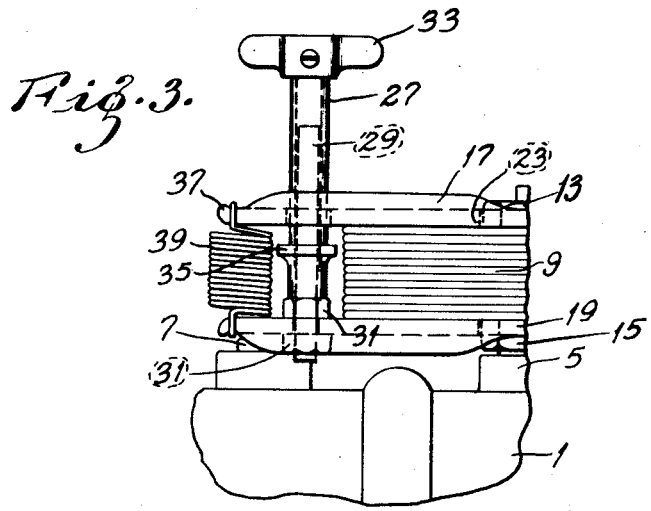
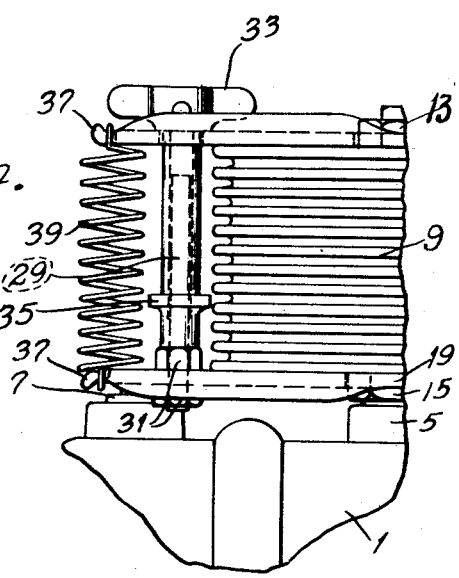
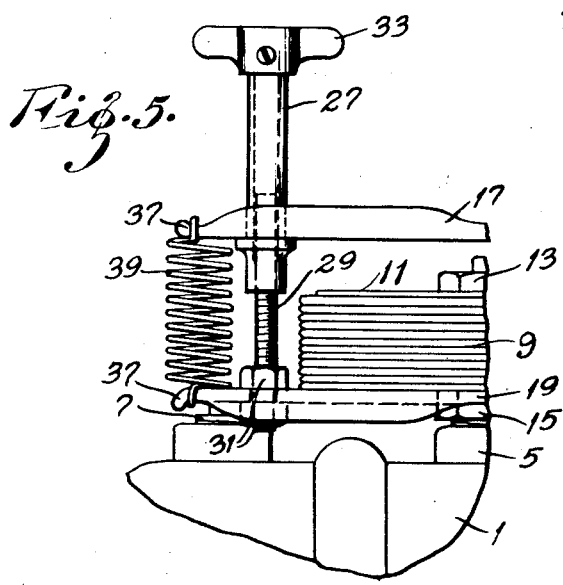

Feb. 19, 1929.
W. S. ALLEN
1,702,990
PRESSURE DEVICE
Filed May 5, 1928   3 Sheets-Sheet 3
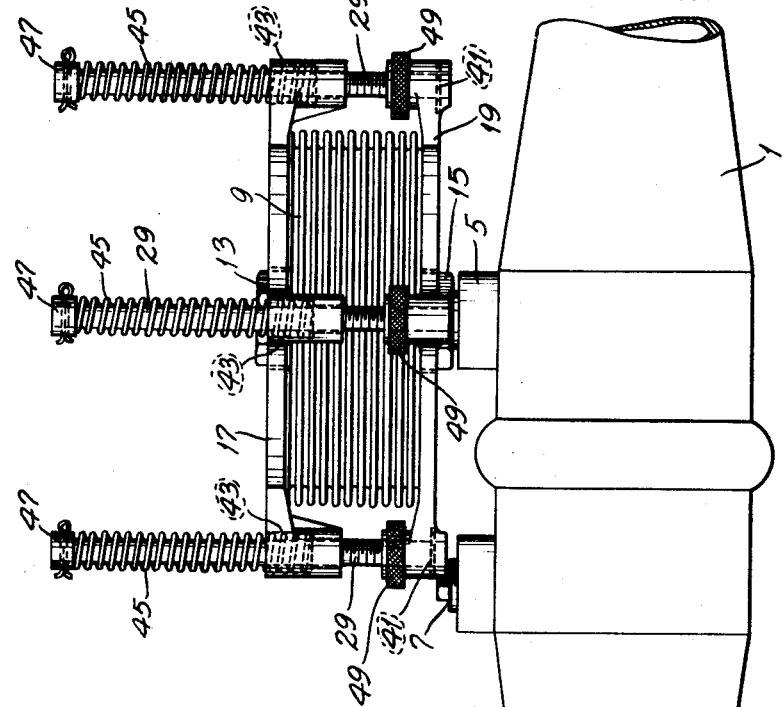
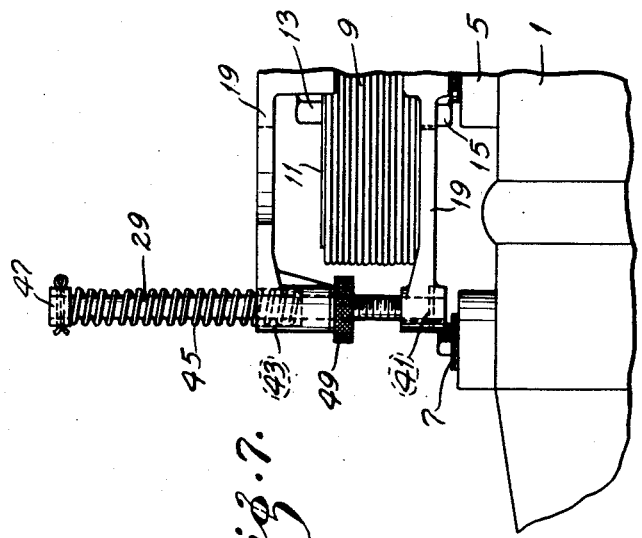
William S. Allen, Inventor,
Deloz F. Haynes,
Attorney Patented Feb. 19, 1929.

1,702,990

UNITED STATES PATENT OFFICE.

WILLIAM S. ALLEN, OF PHILADELPHIA, PENNSYLVANIA, ASSIGNOR TO PHILIP H. CHASE, OF PHILADELPHIA, PENNSYLVANIA.

PRESSURE DEVICE.

Application filed May 5, 1928. Serial No. 275,546.

This invention relates to pressure devices and with regard to certain more specific features, to compressor clamps for collapsible containers, used more particularly in connection with metal-sheathed cable and other apparatus having fluid within.

Among the several objects of the invention may be noted the provision of a compressor clamp for use in applying positive external pressure to collapsible containers having a fluid therein, said pressure being effective throughout a desired range of expansion or contraction; the provision of a device of the class described adapted to function as a positive expansion limiting device; the provision of a device of the class described having a tension adjustment permitting the variation of expansion and contraction limits of the container; the provision of a device of the class described which will function as a reenforcement and protection to the container and the provision of such a device as will permit of maximum simplicity in construction, assembly, operation and repair. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated two of various possible embodiments of the invention, Fig. 1 is a side elevation of a preferred form of the device, certain parts being broken away;

Fig. 2 is a bottom plan view of the device, the view being taken substantially along the line 2—2 of Fig. 1;

Fig. 3 is a fragmentary side elevation showing a completely collapsed position of the device;

Fig. 4 is a view similar to Fig. 3 showing a limiting expanded position of the device;

Fig. 5 is a view similar to Fig. 3 showing a position of the device during manual removal from a collapsible container;

Fig. 6 is a view similar to Fig. 1 showing a modified form of the invention; and Fig. 7 is a view of the modified form, corresponding to Fig. 5 of the preferred form.

Similar reference characters indicate corresponding parts throughout the several views of the drawings.

Referring now more particularly to Fig. 1, there is illustrated at numeral 1 a fluid container such as a splice sleeve used in joining electric cables. A nipple 5 is arranged in the container 1 for passing a fluid such as a liquid. A filling plug is also provided at 7. The reason for the use of the fluid in the container will not be gone into here, because it comprises no part of the present invention per se. It suffices to say that the container is the primary substantially closed chamber requiring a secondary container or reservoir or the like to allow for differential expansion and contraction of fluid and/or the solid parts.

In the present invention the secondary reservoir comprises an expansion chamber 9. This chamber comprises a preferably metallic flexible bellows having closed ends 11. The upper end is provided with a closing cap or plug 13 and the lower end with a nipple 15 engaging said nipple 5.

It will be seen from the above that the expansible chamber 9, if it alone were screwed to the nipple 5, would expand and contract under changes of volume in and within the container 1. Unlimited expansion would result in permanent deformation or bursting of the member 9.

In order to prevent the above unlimited action and provide other advantages, there is provided an upper clamping plate 17 which rests on the top of the collapsible container 9 and which functions in part as a reenforcing member. Below is provided an under clamping plate 19 which bears against the lower end of a container 9 and also acts as a reenforcing member. The plate 19 is provided with a slot 21 for permitting ready removal of the pressure device from the expansion chamber 9. An opening 23 in the upper plate 17 has a similar function and provides access to the closing cap or plug 13. The upper plate 17 is also provided with a plurality of guide openings 25 which slidably receive adjuster and/or guide stems 27, the latter being internally threaded to stud bolts 29 for purpose of vertical adjustment. The stud bolts 29 are locked to the lower plate 19 by suitable nuts 31.

In order that positive external pressure may be applied to the container 9, the plates 17 and 19 are provided with oppositely disposed hooks 37 for holding therebetween a plurality of tension springs 39 (preferably three). By this means there exists a tendency for the plates 17, 19 to be drawn together, whereby pressure is externally applied to the container 9 within the adjustable limits allowed by the nuts 33 and shoulders 35.

Each adjuster 27 carries an upper wing nut and expansion stop 33 held thereto by a suitable set screw or the like. The wing nuts or stops 33 function as expansion limiting stops in their various adjusted positions (see Fig. 4). By means of the wings the adjusters 27 may be turned to raise or lower them through the medium of the said thread, thereby providing a stop adjustment.

Each adjuster 27 is also provided with a lower shoulder 35 engageable with the under side of the upper plate 17 upon contraction of the container 9. Thus there is provided a limiting stop for the downward movement of the upper plate 17. It is clear that if the upper end of the container 9 be soldered or otherwise fastened to the plate 17 that these shoulders 35 also function as contraction limiting stops. However, in the present device the container 9 is not fastened to the plate 17. Hence by raising the adjusters 27, as illustrated in Fig. 5, the plate 17 may be cleared from the container 9 to permit release of pressure, such as for opening the collapsible container or to permit ready removal of the pressure device therefrom.

Fig. 3 shows the container 9 in completely collapsed position with the adjusters in the lowermost and non-limiting contraction stop position.

It will be seen from the above, that all weights, levers, ropes, pulleys, or the building in of devices in the interior of the container, which materially reduces the capacity of the same, are eliminated.

The modified form of the invention shown in Figs. 6 and 7 includes the same features, except where changed as specified hereinafter. Where substantially no changes have been made, numerals used hereinbefore are again used.

Referring to said Figs. 6 and 7, it will be seen that the studs 29 are held to the plate 19 by the use of pins 41. The upper plate 17, instead of slidably engaging adjusters for vertical movement, slidably engages studs 29 themselves and is provided with recesses 43 for socketing compression springs 45 mounted over said studs 29.

At the upper ends the springs 45 react against stops 47 held to the studs 29. The springs 45 react from said stops 47 to press the plate 17 down against the container 9.

The studs 29 have threaded thereon tension adjusters 49 the purpose of which is to be screwed upwardly as shown in Fig. 7 to relieve the container 9 of the spring action over any predetermined range of movement.

Also, the plate 17 is thus capable of being lifted from the container 9 to permit removal of the pressure device.

It will be seen from the above that this device operates to prevent continued elongation of the bellows.

The pressure clamp is readily removable from the expansion chamber and the expansion chamber is readily removable from the container. For refilling or the like, the pressure may be relieved merely by manipulating the adjusters 27 or 49 so as to lift the plate 17.

Furthermore, the arrangement not only reenforces the expansible container 9, but also functions as a guard therearound to prevent damage from striking or the like.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a device of the class described, a primary container, a secondary expansible container communicating therewith, clamping means engaging said expansible container, resilient means for effecting clamping action and adjustable means for limiting said clamping action.

2. In a device of the class described, a primary container, a secondary expansible container communicating therewith, clamping means engaging said expansible container, resilient means for effecting clamping action and adjustable means for limiting said clamping action, said last-named means being adapted to limit the expansion of said container.

3. In a device of the class described, a primary container having a fluid therein, a closed flexible secondary container communicating with the primary container, spring pressed means externally of the secondary container adapted to compress the same and means for adjustably limiting the expansive and compressive movement of said spring pressed means.

4. In a device of the class described, a primary container having a fluid therein, a closed flexible secondary container communicating with the primary container, said secondary container permitting expansion and contraction of fluid, means for applying external pressure to said secondary container and means for making said pressure effective throughout a predetermined adjustable range of expansion of contraction.

5. In a device of the class described, a primary container, a secondary expansible container communicating therewith, clamping and reenforcing plates positioned oppositely outside of the container, springs adapted to press said clamping plates together to compress the container, said plates being located to reenforce and protect the container and said springs being located around the container for protective purposes.

6. In a device of the class described, a primary container, a secondary expansible container communicating therewith, clamping and reenforcing plates positioned oppositely outside of the container, springs adapted to press said clamping plates together to compress the container, said spring being located around the container for protective purposes, guide stems fastened to one plate and slidably engaging the other and means mounted on said stems for limiting the action of said spring.

7. In a device of the class described, a primary container, a secondary expansible container communicating therewith, clamping and reenforcing plates positioned outside of the container, springs adapted to said clamping plates together to compress the container, said springs being located around the container for protective purposes, at least one guide stem fastened to one plate and slidably engaging the other and adjustable means mounted on said stem for limiting the action of said springs, said adjustable means limiting the expansion of said secondary container.

8. In a device of the class described, a primary container, a secondary expansible container communicating therewith, clamping and reenforcing plates positioned outside of the container, at least one guide stem fixed to one plate and slidably engaging the other plate, a stop on said stem beyond said other plate and a compression spring reacting between said stop and said other plate.

9. In a device of the class described, a primary container, a secondary expansible container communicating therewith, clamping and reenforcing plates positioned outside of the container, at least one guide stem fixed to one plate and slidably engaging the other plate, a stop on said stem beyond said other plate, a compression spring reacting between said stop and said other plate, and an adjustable stop on said stem between the plates.

10. In a device of the class described, a primary container, a secondary expansible container communicating therewith, clamping and reenforcing plates positioned outside of the container, at least one guide stem fixed to one plate and passing through the other and adjustable means on said stem bearing stops on either side of said other plate and tension springs adapted to draw said plates together.

11. In a device of the class described, a primary container, a secondary expansible container communicating therewith, clamping and reenforcing plates positioned outside of the container, guide stems fastened to one plate and passing through the other and means mounted on said stems for limiting the action of said spring, said stems being located around the container for protective purposes.

In testimony whereof, I have signed my name to this specification this 27th day of April, 1928.

WM. S. ALLEN.